(12) United States Patent
Wang et al.

(10) Patent No.: US 12,535,180 B2
(45) Date of Patent: Jan. 27, 2026

(54) TELEPROMPTER AND REAR MOUNTING BRACKET

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD., Shenzhen (CN)

( * ) Notice: Subject to any disclaimer, the term of this patent is extended or adjusted under 35 U.S.C. 154(b) by 117 days.

(21) Appl. No.: 18/396,109

(22) Filed: Dec. 26, 2023

(65) Prior Publication Data
US 2025/0129881 A1    Apr. 24, 2025

(30) Foreign Application Priority Data

Oct. 18, 2023  (CN) .......................... 202322808140.9

(51) Int. Cl.
*F16M 11/20*    (2006.01)
*H04N 5/222*    (2006.01)

(52) U.S. Cl.
CPC ....... *F16M 11/2092* (2013.01); *H04N 5/2222* (2013.01); *F16M 2200/027* (2013.01)

(58) Field of Classification Search
CPC ......... F16M 11/2092; F16M 2200/027; H04N 5/2222
USPC .......................................... 348/375
See application file for complete search history.

(56) References Cited

U.S. PATENT DOCUMENTS

2009/0256970 A1*  10/2009  Bilbrey ............... H04N 5/2222
                                                                348/722

* cited by examiner

*Primary Examiner* — Joel W Fosselman
(74) *Attorney, Agent, or Firm* — Westbridge IP LLC

(57) ABSTRACT

Disclosed are a teleprompter and a rear mounting bracket. The teleprompter includes a reflection structure, a front support plate and a second sliding seat provided with a pipe clamp; the second sliding seat is installed on the reflection structure, and the pipe clamp is configured to detachably install a rear mounting bracket equipped with a guide tube; and the front support plate is connected to a front of the reflection structure. The technical solution of the present application solves the problem of poor flexibility of the camera equipment by using a first sliding seat provided with a pipe clamp to cooperate with a rear mounting bracket equipped with a guide pipe.

14 Claims, 9 Drawing Sheets

TELEPROMPTER AND REAR MOUNTING BRACKET

CROSS-REFERENCE TO RELATED APPLICATIONS

This application claims priority to Chinese Patent Application No. 202322808140.9, filed on Oct. 18, 2023, the content of which is incorporated herein by reference in its entirety.

TECHNICAL FIELD

The present application relates to the technical field of teleprompter structures, in particular to a teleprompter and a rear mounting bracket.

BACKGROUND

The basic structure of an existing teleprompter consists of three parts: a frame, a front support plate installed in front of the frame and a rear mounting bracket installed on the back of the frame, and the frame is equipped with a reflection structure for reflecting the subtitles or patterns or other content of the display device. The front support plate is used to place display devices (mobile phones, tablets or the like), and the rear mounting bracket is used to install camera equipment.

However, the rear mounting bracket in the existing teleprompter is fixed on the frame of the reflection structure or the connector of the reflection structure and cannot be disassembled and installed as a whole. When it is necessary to replace the camera equipment on the rear mounting bracket, the camera equipment can only be removed individually from the rear mounting bracket and additional camera equipment is mounted on the rear mounting bracket, the rear mounting bracket and the camera equipment cannot be disassembled and replaced together in a modular manner.

SUMMARY

The main purpose of the present application is to provide a new teleprompter, which is designed to modularly install or disassemble the rear mounting bracket and camera equipment on the teleprompter, thereby improving flexibility.

In order to achieve the above purpose, the teleprompter proposed by the present application includes a reflection structure, a front support plate and a first sliding seat provided with a pipe clamp; the first sliding seat is installed on the reflection structure, and the pipe clamp is configured to detachably install a rear mounting bracket equipped with a guide tube; and the front support plate is connected to a front of the reflection structure.

In an embodiment, the pipe clamp includes a mounting hole provided on an edge of the first sliding seat and provided with an opening, the opening is connected with the mounting hole so that a side wall of the mounting hole is elastically deformable to form a movable clip, and the first sliding seat is further provided with a driving rod that drives the movable clip to lock or loosen the guide tube installed in the mounting hole.

In an embodiment, a number of the mounting holes and a number of the guide tubes are both set to two in one-to-one correspondence, and one movable clip is formed on each mounting hole; one of the movable clips is provided with a threaded hole or an unthreaded hole, and the other movable clip is provided with a threaded hole; the driving rod is configured as a driving screw connected with a knob, and the driving screw is provided with screw thread that matches the threaded hole on the clip; and the driving screw is screwed into the threaded hole or unthreaded hole of the movable clip from a side wall of one of the movable clips, and is connected to the threaded hole of the other movable clip after passing through the first sliding seat with a gap.

In an embodiment, the number of the mounting holes and the number of the guide tubes are both set to two in one-to-one correspondence, and one movable clip is formed on each mounting hole; each movable clip is provided with a threaded hole or an unthreaded hole, the first sliding seat is provided with a threaded hole at a position directly opposite to the threaded hole or unthreaded hole on each movable clip; the driving rod is configured as a driving screw connected with a knob, and the driving screw is provided with an external screw thread that matches the threaded hole on the first sliding seat; and each movable clip is provided with a driving rod correspondingly, rotate the knob to drive the driving screw to pass through the threaded hole or unthreaded hole of the corresponding movable clip and then screw into the corresponding threaded hole on the first sliding seat.

In an embodiment, the reflection structure further includes a first moving plate, and the first sliding seat is slidingly or fixedly mounted on the first moving plate.

The present application also proposes a rear mounting bracket for the teleprompter as mentioned above, the rear mounting bracket includes: a guide tube configured for detachably mounting on a pipe clamp of the teleprompter, and a second sliding seat slidingly installed on the guide tube, and the second sliding seat is configured for installing camera equipment.

The technical solution of the present application adopts a first sliding seat provided with a pipe clamp to cooperate with a rear mounting bracket equipped with a guide tube, after the camera equipment is installed on the rear mounting bracket, the first sliding seat can be slid on the guide tube through the pipe clamp, so that the rear mounting bracket and the camera equipment can be modularly installed or disassembled on the teleprompter, which improves flexibility.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

Figure 1:
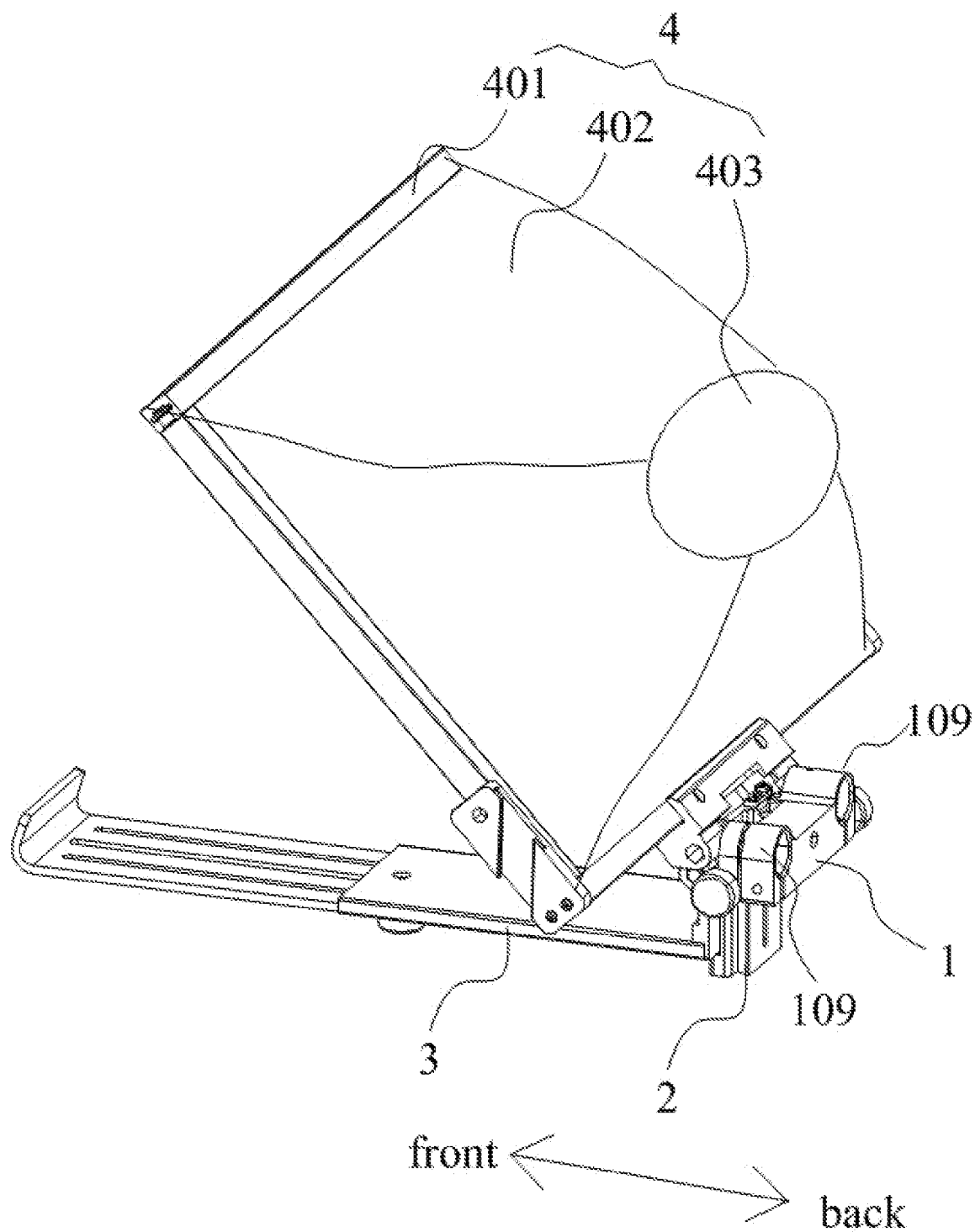
FIG. 1 is a structural schematic view of a teleprompter according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described below in conjunction with the accompanying drawings in the embodiments of the present application. Obviously, the described embodiments are only some of the embodiments of the present application, but not all of the embodiments. Based on the embodiments of the present application, all other embodiments obtained by those of ordinary skill in the art without any creative work fall within the protection scope of the present application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In the present application, unless otherwise clearly stated and limited, the terms "connection", "fixed" and so on should be understood in a broad sense. For example, "connection" can be a fixed connection, a detachable connection or an integral body; it can be a mechanical connection or an electrical connection; it can be a direct connection or an indirect connection through an intermediate medium; it can be an internal connection between two components or the interaction between two components, unless otherwise expressly limited. For those of ordinary skill in the art, the specific meanings of the above terms in the present application can be understood according to specific circumstances.

In addition, if there are descriptions involving "first", "second" or the like in the embodiment of the present application, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the meaning of "and/or" appearing in the entire text includes three parallel solutions, taking "A and/or B" as an example, it includes solution A, or solution B, or a solution that satisfies both A and B at the same time. In addition, the technical solutions of various embodiments can be combined with each other, but it is based on that those of ordinary skill in the art can realize. When the combination of technical solutions is contradictory or cannot be realized, it should be considered that such combination of technical solutions does not exist and is not within the protection scope claimed by the present application.

The teleprompter includes a reflection structure 4, a front support plate 3 and/or a rear mounting bracket detachably mounted on the reflection structure 4, the front support plate 3 is connected to the reflection structure 4 and is located in the front of the reflection structure 4, the reflection structure 4 includes a frame 401, a light-shielding cloth 402 set on the outside of the frame 401, a connector for supporting the mirror frame 401, and a reflective lens set on the frame 401 for reflecting and reading the contents of electronic screens such as tablets and mobile phones and so on. A notch 403 is formed at the tail of the light-shielding cloth 402, the notch 403 is set toward the second sliding seat 6 in the rear mounting bracket, and the notch 403 is configured to align the lens of the camera equipment installed on the rear mounting bracket. The frame 401 is rotatingly mounted on the connector, and the front support plate 3 is fixedly connected to the connector, rotating the frame 401 can adjust the angle between the reflective lens and the electronic screen located on the front support plate 3. The connector serves as a connecting frame, which can be the first moving plate 2 or any structure in the teleprompter in the existing technology.

Figure 4:
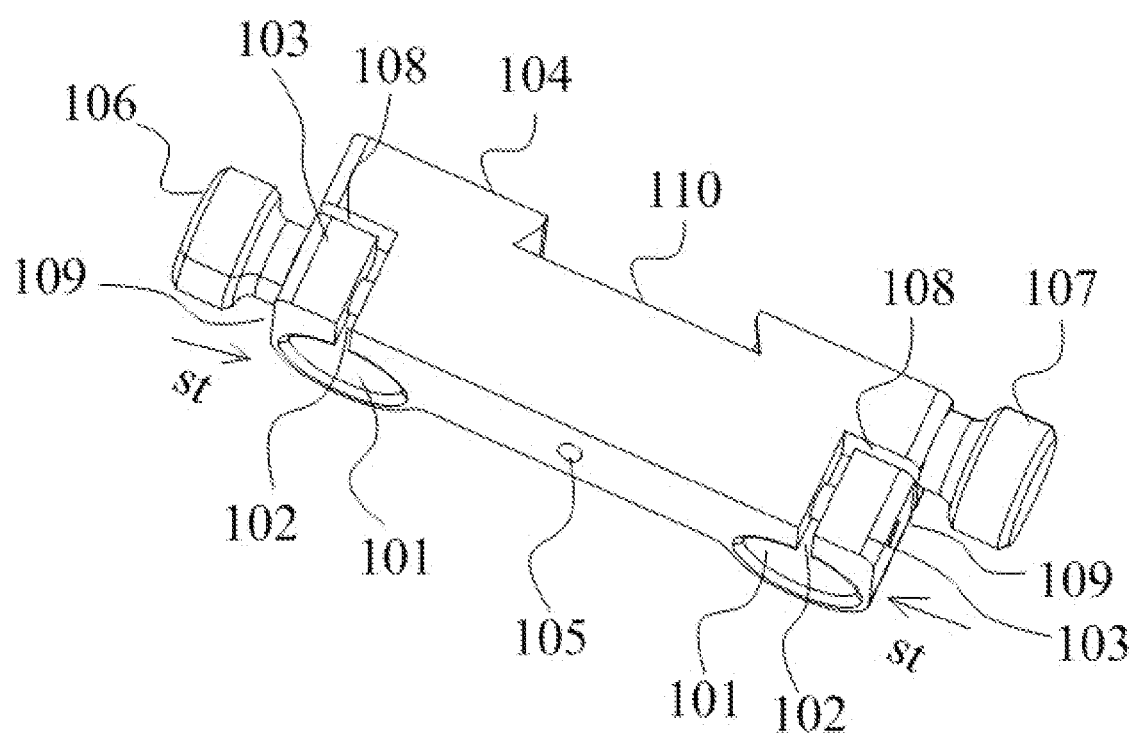
FIG. 4 is a structural schematic view of an embodiment of a first sliding seat in FIG. 1.

The teleprompter according to an embodiment of the present application, with reference to FIG. 1 and FIG. 4, includes a reflection structure 4, a front support plate 3 and a first sliding seat 1 provided with a pipe clamp 109; the first sliding seat 1 is installed on the reflection structure 4, and the pipe clamp 109 is configured to detachably install a rear mounting bracket equipped with a guide tube 5; and the front support plate 3 is connected to a front of the reflection structure 4, the first sliding seat 1 and the front support plate 3 may install on the frame 401, or may install on the frame 401 through a connector, such as the first moving plate 2.

It should be noted that the first sliding seat 1 can include two embodiments, that is, the first sliding seat 1 can be slidingly connected to the connector, or can be non-slidingly fixed on the connector.

Referring to FIG. 1 to FIG. 4, the rear mounting bracket with photography equipment or photography accessories such as a quick release plate can be used as an integral module and can be detachably installed through the guide tube 5 and the pipe clamp 109 of the first sliding seat 1, that is, when needed, a certain rear mounting bracket can be installed on the pipe clamp 109 of the first sliding seat 1 through the guide tube 5, on the contrary, when it is necessary to disassemble and replace the camera equipment, it can directly remove the rear mounting bracket by loosening the pipe clamp and install another rear mounting bracket. Photographers can prepare different rear mounting bracket modules with photographic equipment or photographic accessories in advance, these rear mounting brackets with different photographic equipment or photographic accessories all include a guide tube 5 corresponding to the pipe clamp 109 of the first sliding seat 1. The different photographic equipment or photographic accessories installed on the guide tube 5 can be different photographic devices such as mobile phones, cameras and corresponding accessories. For example, the rear mounting bracket shown in FIG. 3 includes a guide tube 5, a second sliding seat 6 and a rabbit cage 11 installed on the second sliding seat 6, a camera or a mobile phone can be installed on the rabbit cage 11. Another rear mounting bracket shown in FIG. 7 includes a guide tube 5, a second sliding seat 6 and a camera quick release plate 7 installed on the second sliding seat 6, the camera is detachably installed on the camera quick release plate 7. Another rear mounting bracket shown in FIG. 8 includes a guide tube 5, a second sliding seat 6 and a bottom plate 9 installed below the second sliding seat 6. The bottom plate 9 can choose a dovetail structure, the bottom plate 9 with the dovetail structure is configured to cooperate with the dovetail groove of the head on the tripod to facilitate the fixed installation of the teleprompter on the tripod. In addition, in FIG. 7, a camera quick release plate 7 can also be installed on the second sliding seat 6 to fix the camera at the same time, the rear mounting bracket serves as a module. In addition to these application embodiments, many other application embodiments may also be included, as long as the guide tube 5 adapted to the pipe clamp 109 of the teleprompter is provided on the rear mounting bracket, it can be detachably connected to the teleprompter. When it is necessary to replace the photography device, it can be fixedly installed or disassembled directly through the pipe clamp 109, in this way, different rear mounting brackets are modularized, and the photography devices of different modules can be easily replaced through the design of the pipe clamp 109, and the rear mounting bracket can be modularly disassembled or installed on the teleprompter in this design, which is fast and efficient.

Figure 2:
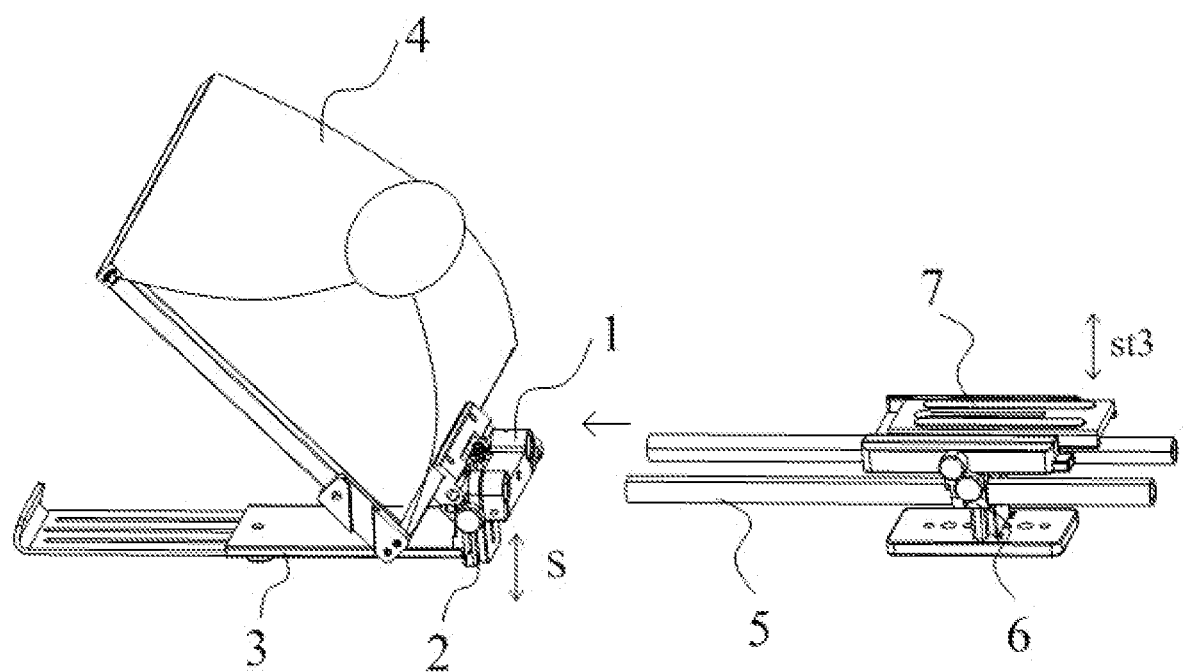
FIG. 2 is a principle schematic view of installing a rear mounting bracket module on a teleprompter according to an embodiment of the present application.
Figure 11:
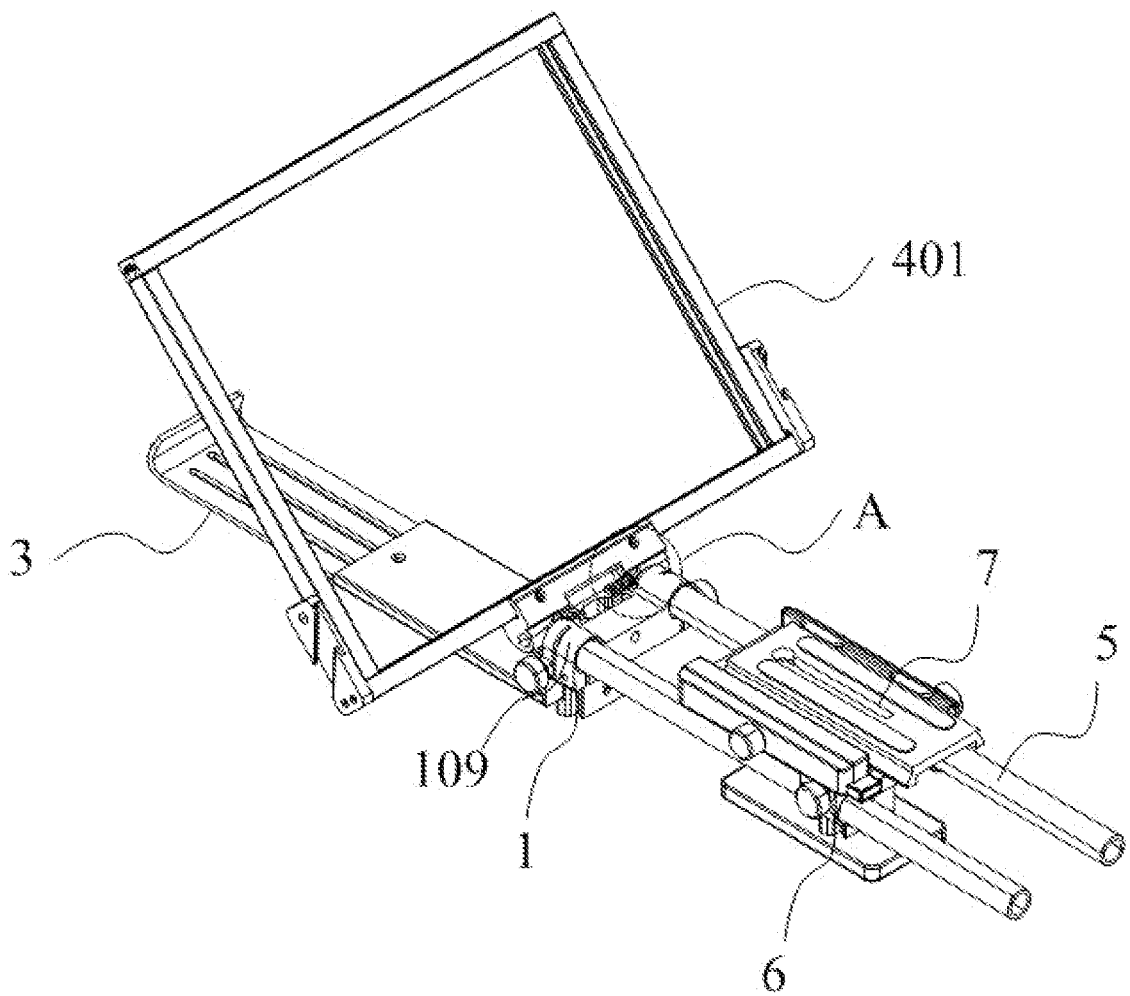
FIG. 11 is a structural schematic view of cooperation between a teleprompter and a rear mounting bracket according to an embodiment of the present application.
Figure 12:
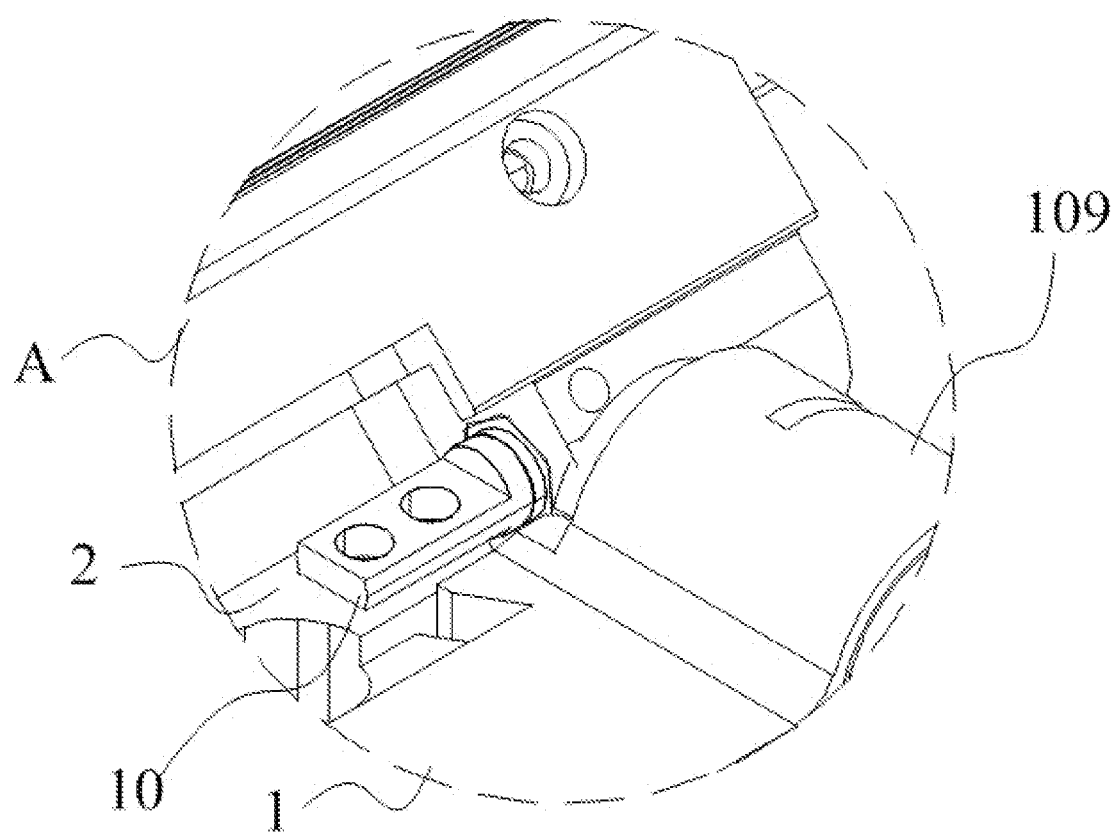
FIG. 12 is an enlarged schematic view of A in FIG. 11.

In an embodiment, the first sliding seat 1 can be fixedly installed on the connector of the reflection structure 4, for example, by means of screw thread, welding, other connecting mechanisms or other means to install the first sliding seat 1 on the connector of the reflection structure 4, the connector can be the first moving plate 2 which can be fixed on the frame 401, and install the first sliding seat 1 on the reflecting structure 6. In a specific embodiment, a guide groove 110 is provided on the side wall of the first sliding seat 1, and a guide rail matching the guide groove 110 is provided on the first moving plate 2, the guide groove 110 can be set as a dovetail groove, and the guide rail can be set as a dovetail plate, as shown in FIG. 2. The first sliding seat 1 can move in the S direction, thereby driving the rear mounting bracket connected to the pipe clamp 109 to move up and down on the teleprompter, thereby facilitating the adjustment of the position between the photography equipment installed on the rear mounting bracket and the notch 403. In another embodiment, as shown in FIG. 11 and FIG. 12, the frame 401 and the first moving plate 2 are connected through the connecting shaft 10, and the connecting shaft 10 can select a damping rotating shaft, the angle of the frame 401 can be adjusted conveniently under the action of the damping rotating shaft, and the damping rotating shaft and the first moving plate 2 are connected by bolts.

The structural principle of the first sliding seat 1 will be depicted as following.

Figure 5:
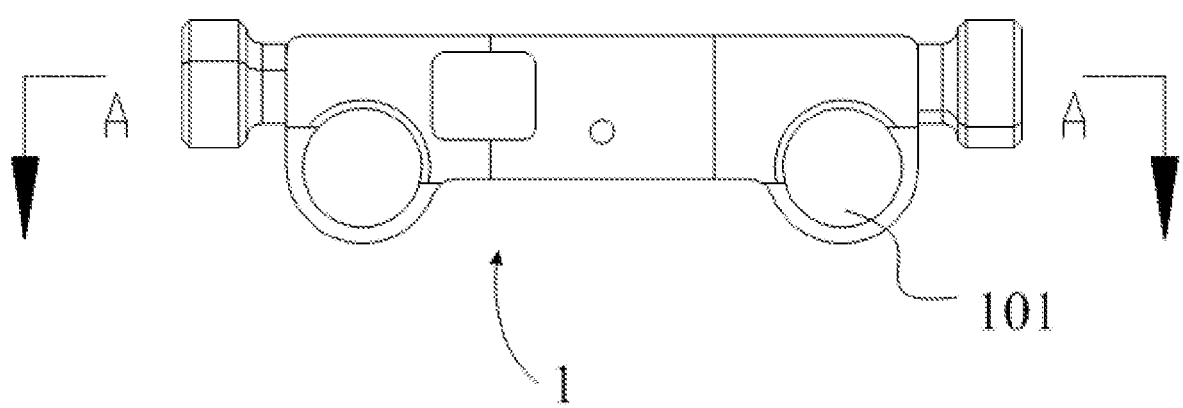
FIG. 5 is a side schematic view of the first sliding seat in FIG. 4.
Figure 6:
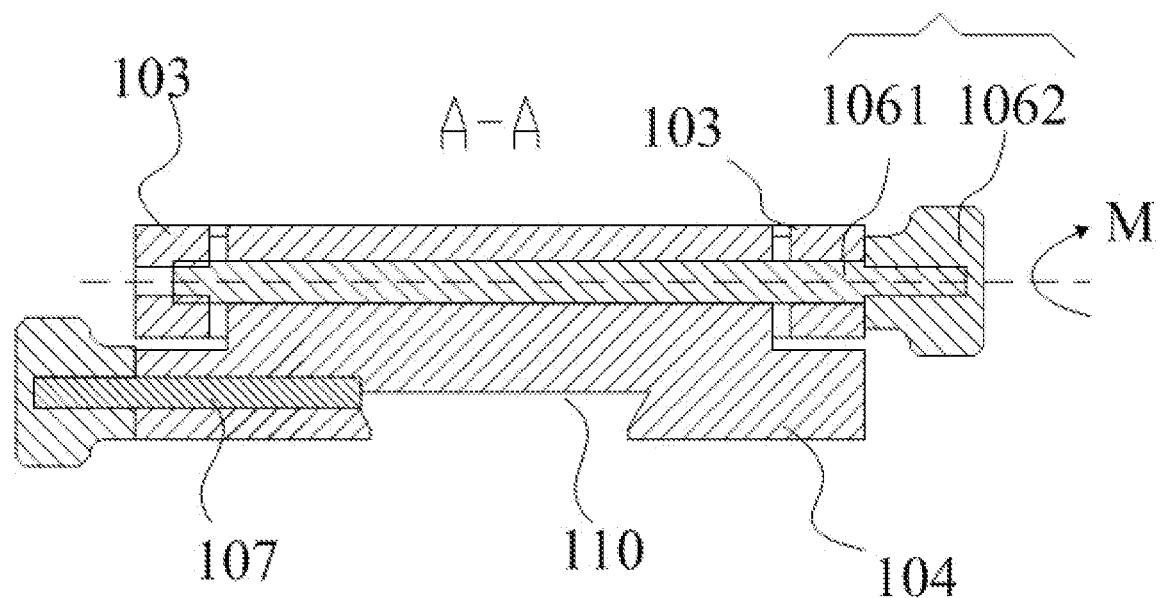
FIG. 6 is a cross-sectional view at A-A in FIG. 5.

In an embodiment, the structure of the first sliding seat 1 is as shown in FIG. 4 to FIG. 6, the pipe clamp 109 includes a mounting hole 101 provided on an edge of the first sliding seat 1 and provided with an opening 102, the opening 102 is connected with the mounting hole 101 so that a side wall of the mounting hole 101 is elastically deformable to form a movable clip 103, and the first sliding seat 1 is further provided with a driving rod 106 that drives the movable clip 103 to lock or loosen the guide tube 5 installed in the mounting hole 101. In this embodiment, the mounting hole 101 is provided on the edge of the first sliding seat 1, after it is cut to form an opening 102, as shown in FIG. 4, when the driving rod 106 pushes the opening 102 to close, the mounting hole 101 will close toward the center, that is, the movable clip 103 will elastically deform and move along the st direction, thereby tightly hugging the guide tube 5 located in the mounting hole 101 and achieving the function of locking the guide tube 5; on the contrary, when the driving rod 106 is released, the movable clip 103 elastically resets and moves in the opposite direction of st to release the guide tube 5.

In another embodiment, as shown in FIG. 4, the first sliding seat 1 is further provided with a boss 104 protruding in a direction perpendicular to the center line of the mounting hole 101, the guide groove 110 is provided on the boss 104, and the guide groove is perpendicular to the center line of the mounting hole, a gap 108 is provided on the parts on both sides of the boss 104 directly facing the movable clip 103 to facilitate the elastic deformation of the movable clip 103, a positioning rod 107 is connected to the outside of the boss 104, the positioning rod 107 is threaded with the first sliding seat 1; after the positioning rod 107 is threaded into the first sliding seat 1, it can enter the guide groove 110, driving the positioning rod 107 can make the positioning rod 107 move in a direction closer to or away from the first moving plate 2 that cooperates with the guide groove 110. As shown in FIG. 2 and FIG. 4, when the first sliding seat 1 moves to the preset position along the S direction, rotate the positioning rod 107 to make it enter the guide groove 110 and resist the first moving plate 2, thereby preventing the first sliding seat 1 from continuing to slide along the S direction, thus having the function of locking the position; on the contrary, when the positioning rod 107 is rotated in the reverse direction, the first sliding seat 1 can be unlocked so that it can slide along the first moving plate 2.

The locking principle of the drive rod 106 will be depicted as following.

Referring to FIG. 6, in a specific embodiment of the driving rod 106, the driving rod 106 is a driving screw 1061, a knob 1062 is fixed at the end of the driving screw 1061, the driving screw 1061 is screwed into the threaded hole or unthreaded hole of the movable clip 103 from a outer side wall of one of the movable clips 103, and is connected to the threaded hole of the other movable clip 103 after passing through the first sliding seat 1 with a gap. In order to allow the driving screw 1061 to move flexibly along the axis line in the first sliding seat 1, there is a clearance fit between the part of the driving screw 1061 located in the first sliding seat 1 and the first sliding seat 1. In another embodiment, a number of the mounting holes 101 and a number of the guide tubes 5 are both set to two in one-to-one correspondence, and one movable clip 103 is formed on each mounting hole 101, referring to FIG. 6, in an embodiment, that is, when both left movable clips 103 and right movable clips 103 are both provided with threaded holes, the driving screw 1061 is provided with an external screw thread that matches the threaded hole on the movable clip 103, the driving screw 1061 passes through the movable clip 103 on the right, the first sliding seat 1 and the movable clip 103 on the left in sequence, when the knob 1061 is rotated along the M direction to drive the end of the driving screw 1061 to screw into the threaded hole of the movable clip 103 on the left side as shown in FIG. 6, since the driving screw 1061 and the first sliding seat 1 have a clearance fit, as the depth of the driving screw 1061 screwed into the movable clip 103 on the left side deepens, the distance between the left movable clip 103 and the right movable clip 103 decreases, referring to FIG. 4, the driving screw 1061 drives the left movable clip 103 and the right movable clip 103 to elastically deform in the st direction at the same time, thereby shrinking the opening 102, achieving the purpose of shrinking the mounting hole 101, thereby tightly holding the guide tube 5 located in the mounting hole 101, and achieving the function of locking the guide tube 5; on the contrary, rotating the knob 1061 in the opposite direction of M can loosen the guide tube 5.

Referring to FIG. 6, in another embodiment, when the movable clip 103 on the left side is provided with a threaded hole, the movable clip on the right side is an unthreaded hole without screw thread, and the end of the driving screw 1061 is provided with an external screw thread that matches the threaded hole on the movable clip 103 on the left side, the driving screw 1061 passes through the movable clip 103 on the right side, the first sliding seat 1 and the movable clip 103 on the left side in sequence, when the knob 1062 is rotated along the M direction to drive the end of the driving screw 1061 to screw into the threaded hole of the movable clip 103 on the left side as shown in FIG. 6, since the driving screw 1061 and the first sliding seat 1 have a clearance fit, as the depth of the driving screw 1061 screwed into the movable clip 103 on the left side deepens, as shown in FIG. 4, the left movable clip 103 and the right movable clip 103 elastically deform along the st direction, and the distance of the driving screws 1061 between the left movable clip 103 and the right movable clip 103 decreases, the side wall of the knob 1061 is in contact with the contact surface of the movable clip 103 on the right side, that is, the driving screws 1061 located between the left movable clip 103 and the right movable clip 103 pull the left movable clip 103 and the right movable clip 103 to elastically deform at the same time, which drives the left movable clip 103 and the right movable clip 103 to deform along the st direction at the same time, thereby tightly holding the guide tube located in the mounting hole 101, and achieving the function of locking; on the contrary, rotating the knob 1061 in the opposite direction of M can loosen the guide tube 5. This design in which one knob can lock and loosen the two guide tubes 5 at the same time not only simplifies the installation, but more importantly, when installing, one hand of the photographer can be free up to hold the camera device at the same time to prevent the camera device from tilting and falling.

In another embodiment, in addition to the above-mentioned design of a single driving rod 106, two driving rods 106 can also be configured to lock the corresponding guide tubes 5 respectively, that is, one driving rod 106 is configured to drive the left movable clip 103 to lock or loosen the guide tube 5, and the other driving rod 106 is configured to drive the right movable clip 103 to lock or loosen the other guide tube 5, that is, in this embodiment, the number of the mounting holes 101 and the number of the guide tubes 5 are both set to two in one-to-one correspondence, and one movable clip 103 is formed on each mounting hole 101, each movable clip 103 is provided with a threaded hole or an unthreaded hole, the first sliding seat 1 is provided with a threaded hole at a position directly opposite to the threaded hole or unthreaded hole on each movable clip 103; the driving rod 106 is configured as a driving screw 1061 connected with a knob 1062, and the driving screw 1061 is provided with an external screw thread that matches the threaded hole on the first sliding seat 1; each movable clip is provided with a driving rod 106 correspondingly, rotate the knob 1062 to drive the driving screw 1061 to pass through the threaded hole or unthreaded hole of the corresponding movable clip 103 and then screw into the corresponding threaded hole on the second sliding seat.

Figure 3:
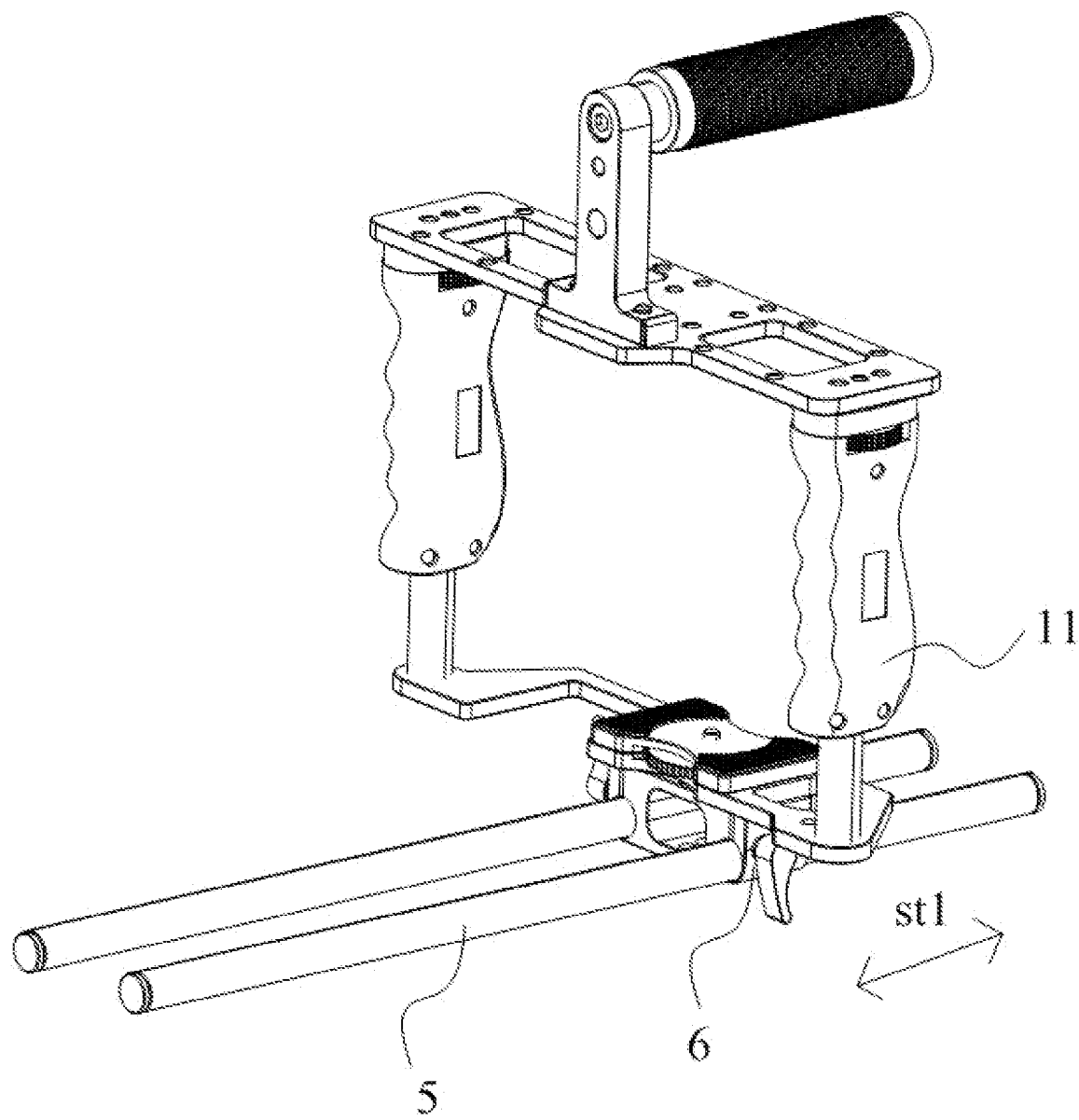
FIG. 3 is a schematic view of a rear mounting bracket module including a rabbit cage and a guide tube according to another embodiment of the present application.
Figure 7:
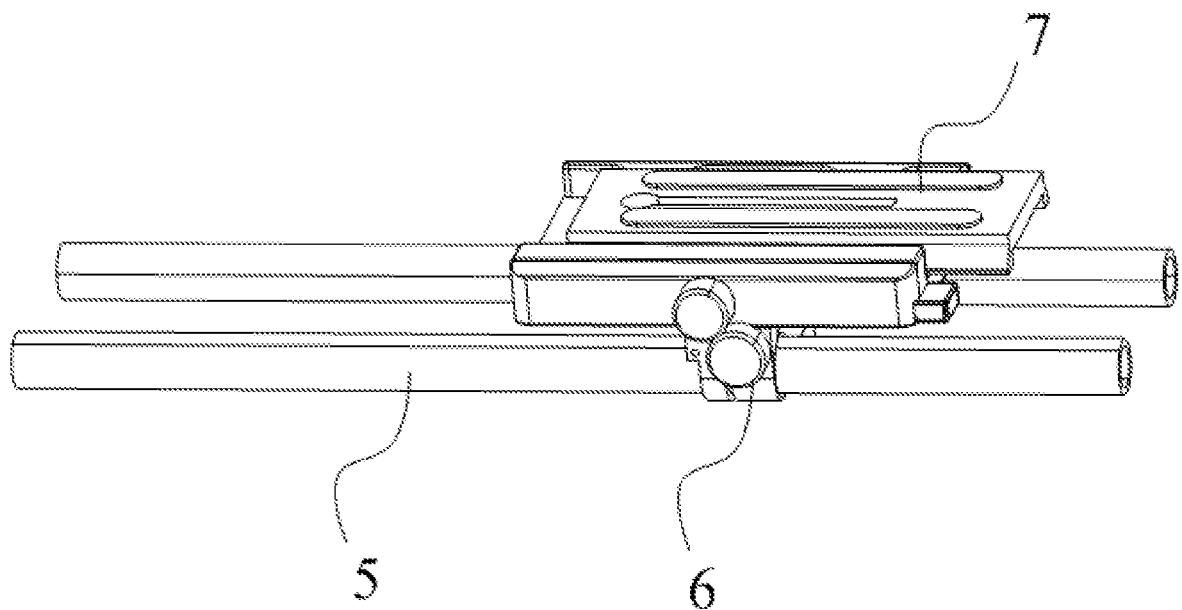
FIG. 7 is a schematic view of a rear mounting bracket module including a guide tube and a quick release plate according to another embodiment of the present application.
Figure 8:
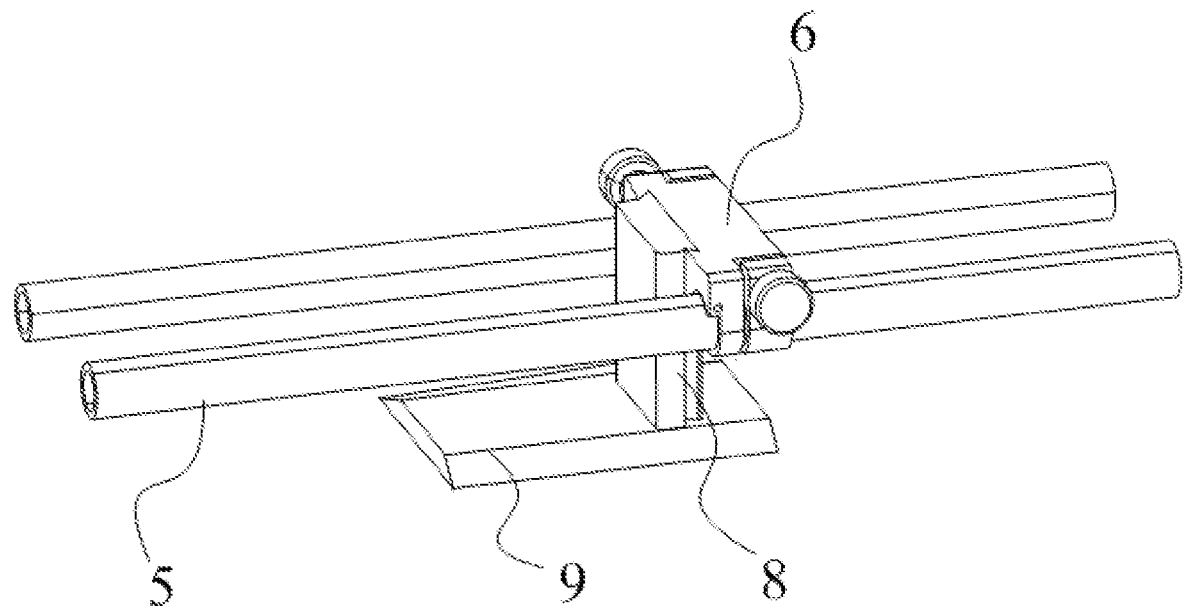
FIG. 8 is a schematic view of a rear mounting bracket module including a bottom plate and a guide tube according to another embodiment of the present application.

In another embodiment, the above-mentioned teleprompter may further include a rear mounting bracket, and the rear mounting bracket includes a guide tube 5 and a second sliding seat 6 slidingly mounted on the guide tube 5, the guide tube 5 is configured to be detachably installed on the pipe clamp 109 of the teleprompter, and the second sliding seat 6 is configured to install camera equipment or be installed on a tripod or other fixed facilities. For example, as shown in FIG. 3, the second sliding seat 6 is installing the accessory rabbit cage 11 on the second sliding seat 6, and then installing the camera equipment (not shown in the figure) on the rabbit cage 11 to achieve that the camera equipment is installed on the second sliding seat 6. As shown in FIG. 7, the second sliding seat 6 is installed with the accessory quick release plate 7, and then the camera equipment (not shown in the figure) is installed on the quick release plate to achieve that the camera equipment is installed on the first sliding seat 1. As shown in FIG. 8, the second sliding seat 6 is installed with a bottom plate 9 with a dovetail structure, and then is installed on a tripod or other fixed facilities with dovetail grooves matching the dovetail plate through the bottom plate 9, the guide tube 5 of the rear mounting bracket can be quickly disassembled and installed on the pipe clamp 109. Therefore, FIG. 3, FIG. 7, and FIG. 8 can be used as a separate rear mounting bracket module and quickly replaced and installed on the pipe clamp 109.

In an embodiment, the second sliding seat 6 and the first sliding seat 1 have the same or similar structure. In this embodiment, for a description of the structure and working principle of the second sliding seat 6, please refer to the description of the structural principle of the first sliding seat 1 above. The guide tube 5 passes through the mounting hole 101 of the pipe clamp 109 of the second sliding seat 6 and is slidingly installed on the second sliding seat 6, as shown in FIG. 3, the second sliding seat 6 can drive the rabbit cage 11 installed on it and the camera equipment (the camera equipment is not shown in the figure) installed on the rabbit cage 11 to slide along the st1 direction, after stopping at the preset position on the guide tube 5, the knob 107 can be rotated to drive the driving rod 106 to lock the guide tube 5 to fix the second sliding seat 6, and this design can adjust the distance between the lens of the camera equipment and the notch 403 of the light-shielding cloth. In addition, the guide groove 110 on the second sliding seat 6 can be matched with the second moving plate 8, and accessories such as the rabbit cage 11 and the quick release plate 7 can be installed on the top of the second moving plate 8, the second moving plate 8 slides along the guide groove 110 to drive the rabbit cage 11, quick release plate 7 and other accessories to rise and fall along the st3 direction, as shown in FIG. 1, FIG. 2, FIG. 3 and FIG. 4, so as to adjust the height of the camera equipment installed on the accessories such as the rabbit cage 11 and the quick release plate 7, thereby aligning the lens of the camera equipment with the notch 403 of the light-shielding cloth 402. The first sliding seat 1 is installed on the teleprompter, when the end of the guide tube 5 of the rear mounting bracket is inserted into the pipe clamp 109 of the first sliding seat 1, rotate the knob 1602 on the first sliding seat 1 to drive the driving rod 106 to lock the guide tube 5, thereby achieving the purpose of conveniently installing the rear mounting bracket on the first sliding seat 1.

Figure 9:
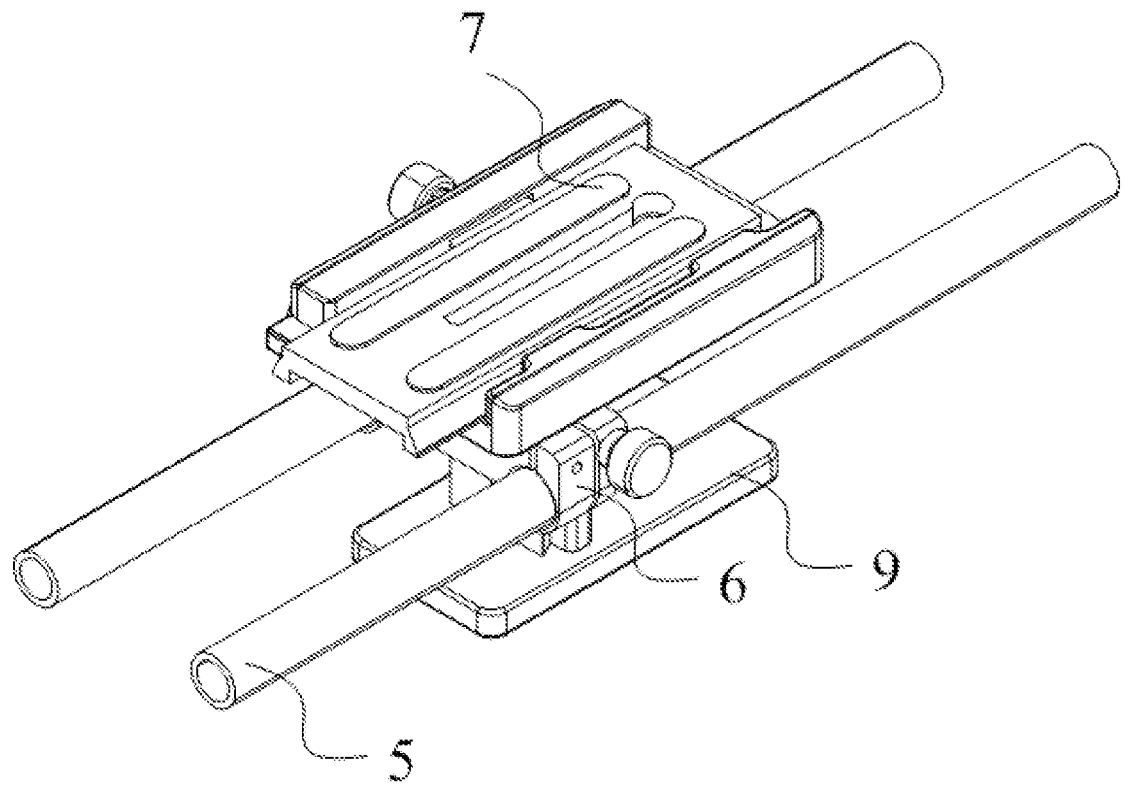
FIG. 9 is a structural schematic view of a second sliding seat, a quick release plate and cooperation between a bottom plate and a guide tube according to an embodiment of the present application.
Figure 10:
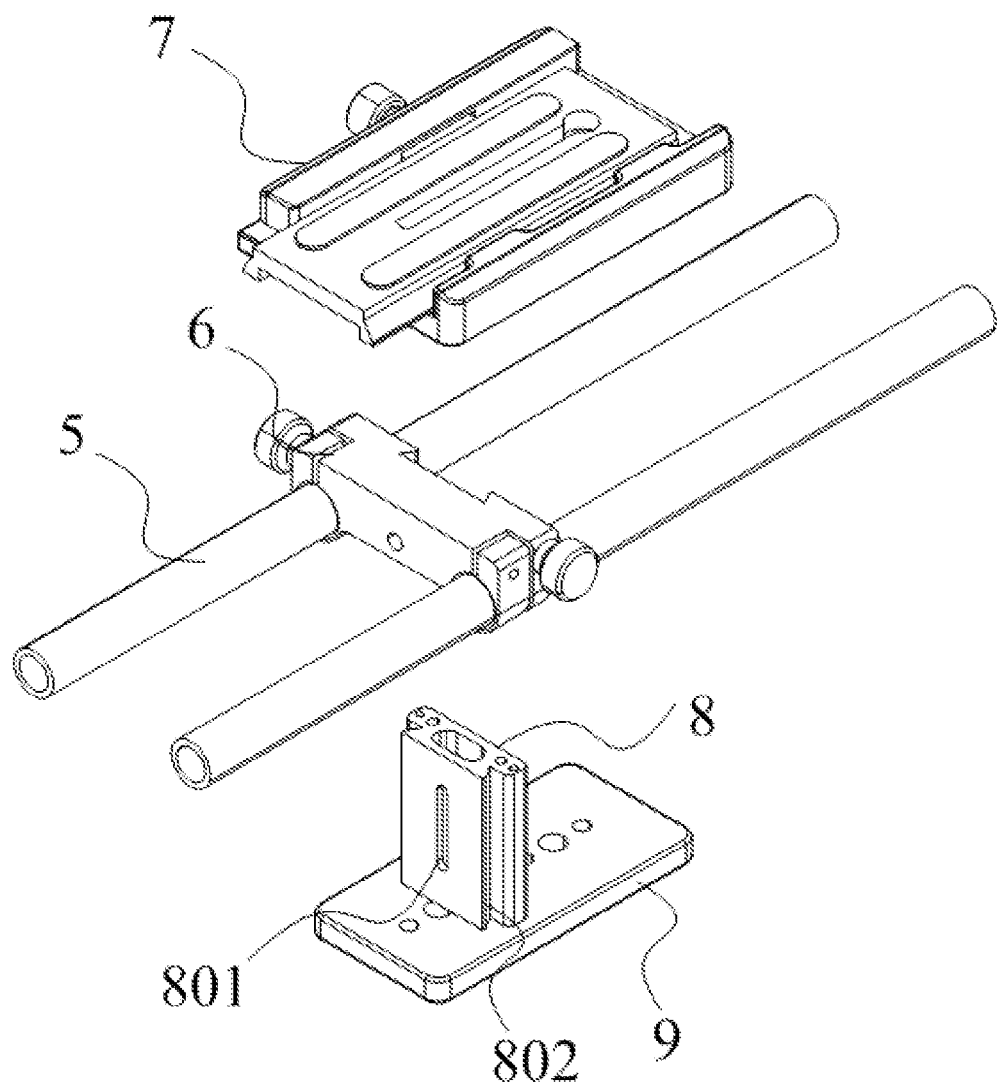
FIG. 10 is an explosion structural schematic view of FIG. 9.

In this embodiment, the rear mounting bracket is configured to be detachably mounted on the teleprompter mentioned above, the guide tube 5 of the rear mounting bracket is connected to the back of the reflection structure 4, furthermore, the guide tube 5 and the second sliding seat 6 are detachably connected or fixedly connected to each other, the second sliding seat 6 is slidingly matched with the guide tube 5, the second sliding seat 6 is configured for installing the camera equipment, after the camera equipment is installed on the second sliding base 6, or after a quick release plate is fixed on the second sliding base 6, the camera equipment is installed on the quick release plate, as shown in FIG. 9 and FIG. 10.

In this embodiment, referring to FIG. 9, the second sliding seat 6 is provided with a mounting hole 101, and the guide tube 5 is located in the mounting hole 101, the cross-section of the mounting hole 101 can choose a circular structure or a prismatic structure.

Furthermore, with reference to FIG. 9, when the guide tube 5 selects a circular structure, the number of the guide tubes 5 is two, and the two guide tubes 5 make the second sliding seat 6 more stable when sliding. When the guide tube 5 selects a prismatic structure, the number of the guide tubes 5 may be one or two, and the second sliding seat 6 can be restricted from rotating around the circumferential direction of the guide tube 5 under the action of the prismatic structure.

Figure 13:
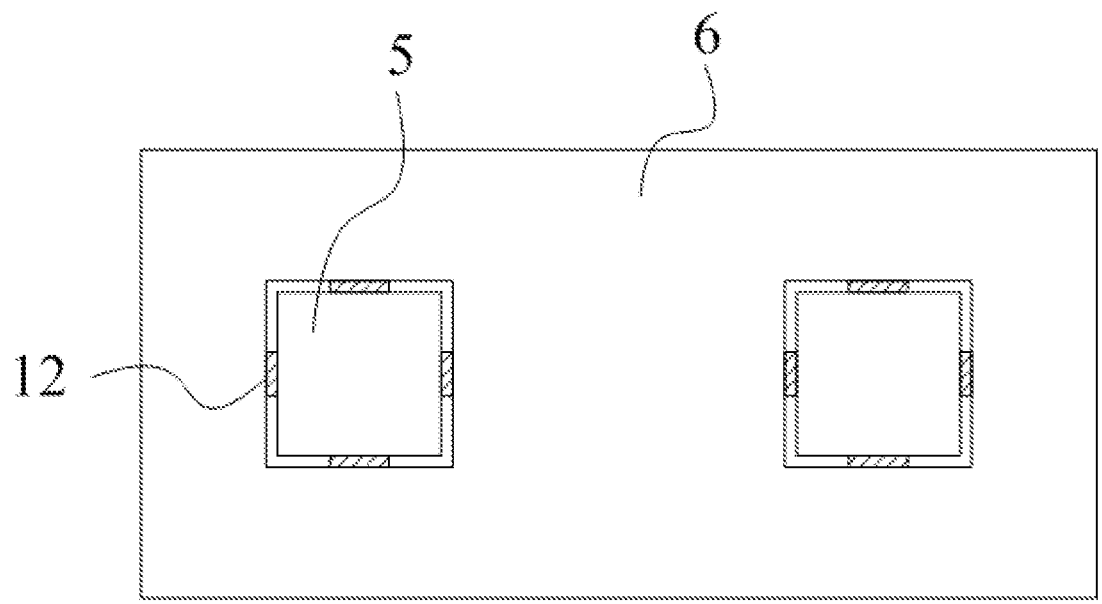
FIG. 13 is a structural schematic view of cooperation between a guide tube and a second sliding seat according to an embodiment of the present application.

Furthermore, referring to FIG. 13, in order to better move the large camera equipment and reduce the friction between the second sliding seat 6 and the guide tube 5 at the same time, rolling elements can be embedded in the outside of the guide tube 5 or in the inner wall of the mounting hole 101. The rolling elements include but are not limited to balls, rollers 12 and so on.

In an embodiment, referring to FIG. 4, the second sliding seat 6 is provided with an opening 102 connecting with the mounting hole 101, the opening 102 can have an L-shaped structure, the opening 102 forms a movable clip 103 outside the mounting hole 101, the second sliding seat 6 is also provided with a driving rod 106 that drives the movable clip 103 to tighten or loosen the guide tube 5, and insert the guide tube 5 into the mounting hole 101, the movable clip 103 is tightened by driving the driving element, so that the second sliding seat 6 clamps the guide tube 5. Under the action of this structure, a certain gap can exist between the outside of the guide tube 5 and the inner wall of the mounting hole 101, thereby facilitating the installation of the above-mentioned rolling elements; at the same time, the guide tube 5 can be clamped under the action of the movable clip 103, so that the second sliding seat 6 is fixed at a designated position on the guide tube 5, thereby reducing the matching accuracy between the guide tube 5 and the mounting hole 101 in the device, and reducing the production difficulty.

In an embodiment, referring to FIG. 4 and FIG. 10, the second sliding seat 6 is provided with a guide groove 110, a second moving plate 8 is slidingly connected in the guide groove 110, and a bottom plate 9 is connected below the second moving plate 8, and the camera equipment is installed on the second moving plate 8, and there exists a preset angular relationship between the sliding direction of the second moving plate 8 and the axis direction of the mounting hole 101. Furthermore, the sliding direction of the second moving plate 8 is perpendicular to the axis direction of the mounting hole 101. The second moving plate 8 sliding in the guide groove 110 can achieve adjustment of the height position of the camera equipment, making the adjustments to the camera equipment of the teleprompter more flexible.

In an embodiment, referring to FIG. 4, the guide groove 110 includes but is not limit to a dovetail groove, the outside of the second moving plate 8 is connected with a dovetail block that matches the dovetail groove, the dovetail block is slidingly engaged with the dovetail groove. Through the sliding engagement between the second moving plate 8 and the dovetail groove, the device is faster and more convenient when adjusting the height position of the camera equipment, and further improves the efficiency of adjusting the camera equipment.

In an embodiment, referring to FIG. 4 and FIG. 10, a positioning rod 107 is connected to an outside of the second sliding seat 6, the positioning rod 107 is connected to the guide groove 110, the positioning rod 107 is threadedly matched with the second sliding seat 6, driving the positioning rod 107 is configured to move the positioning rod 107 in a direction closer to or away from the second moving plate 8, so that the positioning rod 107 has a locking position and an unlocking position. Specifically, rotating the positioning rod 107 to make it close to the outside of the second moving plate 8 and against the outside of the second moving plate 8, and the second moving plate 8 can be locked at a designated position in the guide groove 110 through the friction between the positioning rod 107 and the second moving plate 8.

In an embodiment, with reference to FIG. 4 and FIG. 10, in order to avoid separation of the second moving plate 8 and the second sliding base 6 during the adjustment of the second moving plate 8, the second sliding seat 6 is provided with a connecting hole 105, the connecting hole 105 is provided through the guide groove 110, a limiting slot 801 is provided on the outside of the second moving plate 8, and a limiting screw is connected in the connecting hole 105. Driving the limit screw can move the limit screw toward or away from the limit groove 801, so that the second moving plate 8 and the second sliding seat 6 have a limit function and a disassembly function. As for the limit function, the limiting screw is located in the limiting groove 801 to limit the moving position of the second moving plate 8; as for the disassembly function, the limiting screw is located outside the limiting groove 801 so that the second moving plate 8 can be disassembled from the second moving plate 8. By cooperating between the limiting screw and the limiting groove 801, when adjusting the height of the second moving plate 8, it is possible to avoid pulling the second moving plate 8 out of the second sliding seat 6, thereby preventing the camera equipment from falling.

The present application also requires protection of the rear mounting bracket. In an embodiment of the mounting bracket 4, the rear mounting bracket includes: a guide tube 5, the guide tube 5 is configured for detachably mounting on the pipe clamp 109, and a second sliding seat 6 slidingly installed on the guide tube 5, the second sliding seat 6 is configured for installing camera equipment. For a description of the specific functional principles of the rear mounting bracket of this embodiment, please refer to the above.

The above embodiments are only some embodiments of the present application, and are not intended to limit the scope of the present application. Under the inventive concept of the present application, any equivalent structure or equivalent process transformation made by using the description and accompanying drawings of the present application, or directly or indirectly applied in other related technical fields, is included within the scope of the present application.

What is claimed is:

1. A teleprompter, comprising:
   a reflection structure;
   a front support plate connected to a front of the reflection structure; and a first sliding seat provided with a pipe clamp;
wherein the first sliding seat is installed on the reflection structure, and the pipe clamp is configured to detachably install a rear mounting bracket equipped with a guide tube; and
the reflection structure further comprises a first moving plate, and the first sliding seat is slidingly or fixedly mounted on the first moving plate.

2. The teleprompter according to claim 1, wherein the pipe clamp comprises a mounting hole provided on an edge of the first sliding seat and provided with an opening, the opening is connected with the mounting hole so that a side wall of the mounting hole is elastically deformable to form a movable clip, and the first sliding seat is further provided with a driving rod that drives the movable clip to lock or loosen the guide tube installed in the mounting hole.

3. The teleprompter according to claim 2, wherein a number of the mounting holes and a number of the guide tubes are both set to two in one-to-one correspondence, and one movable clip is formed on each mounting hole;
one of the movable clips is provided with a threaded hole or an unthreaded hole, and the other movable clip is provided with a threaded hole; the driving rod is configured as a driving screw connected with a knob, and the driving screw is provided with screw thread that matches the threaded hole on the clip; and
the driving screw is screwed into the threaded hole or unthreaded hole of the movable clip from a side wall of one of the movable clips, and is connected to the threaded hole of the other movable clip after passing through the first sliding seat with a gap.

4. The teleprompter according to claim 2, wherein a number of the mounting holes and a number of the guide tubes are both set to two in one-to-one correspondence, and one movable clip is formed on each of the mounting holes;
each of the movable clips is provided with a threaded hole or an unthreaded hole, the first sliding seat is provided with a threaded hole at a position directly opposite to the threaded hole or the unthreaded hole on each of the movable clips; the driving rod is configured as a driving screw connected with a knob, and the driving screw is provided with an external screw thread that matches the threaded hole on the first sliding seat; and
each of the movable clips is provided with a driving rod correspondingly, rotating the knob to drive the driving screw to pass through the threaded hole or the unthreaded hole of a corresponding movable clip and then screw into a corresponding threaded hole on the first sliding seat.

5. The teleprompter according to claim 1, further comprising a rear mounting bracket, wherein the rear mounting bracket comprises:
a guide tube removably mounted on the pipe clamp, and
a second sliding seat slidingly mounted on the guide tube.

6. The teleprompter according to claim 5, wherein a mounting hole is provided on an edge of the second sliding seat, and the guide tube is configured to pass through the mounting hole and is slidingly mounted on the second sliding seat.

7. The teleprompter according to claim 6, wherein the mounting hole is provided with an opening, and the opening is connected with the mounting hole; the opening allows that a side wall of the mounting hole is elastically deformable to form a movable clip, and the second sliding seat is further provided with a driving rod that drives the movable clip to lock or loosen the guide tube.

8. The teleprompter according to claim 7, wherein a number of the mounting holes and a number of the guide tubes are both set to two in one-to-one correspondence, and one movable clip is formed on each the mounting hole.

9. The teleprompter according to claim 8, wherein one of the movable clips is provided with a threaded hole or an unthreaded hole, and the other movable clip is provided with a threaded hole; the driving rod is configured as a driving screw connected with a knob, and the driving screw is provided with screw thread that matches the threaded hole on the clip; and the driving screw is screwed into the threaded hole or unthreaded hole of the movable clip from a side wall of one of the movable clips, and is connected to the threaded hole of the other movable clip after passing through the second sliding seat with a gap.

10. The teleprompter according to claim 8, wherein each the movable clip is provided with a threaded hole or an unthreaded hole, the second sliding seat is provided with a threaded hole at a position directly opposite to the threaded hole or the unthreaded hole on each the movable clip;
the driving rod is configured as a driving screw connected with a knob, and the driving screw is provided with a screw thread that matches the threaded hole on the second sliding seat; and
each the movable clip is provided with a driving rod correspondingly, rotating the knob to drive the driving screw to pass through the threaded hole or the unthreaded hole of a corresponding movable clip and then screwing into a corresponding threaded hole on the second sliding seat.

11. The teleprompter according to claim 5, wherein the second sliding seat is provided with a guide groove, and the guide groove is slidingly connected to a second moving plate; and
the second moving plate is configured to move on the guide groove to adjust a height of the second moving plate relative to the reflection structure.

12. The teleprompter according to claim 11, wherein the guide groove is a dovetail groove.

13. The teleprompter according to claim 12, wherein a positioning rod is connected to an outside of the second sliding seat, the positioning rod is connected to the guide groove, the positioning rod is threadedly matched with the second sliding seat; driving the positioning rod is configured to move the positioning rod in a direction closer to or away from the second moving plate, so that the positioning rod has a locking position and an unlocking position; and
in the locking position, the positioning rod is abutted against the second moving plate to limit a movement of the second moving plate; in the unlocking position, the positioning rod is separated from the second moving plate so that the second moving plate is movable.

14. A rear mounting bracket, configured to cooperate with the teleprompter according to claim 1, comprising:
a guide tube configured for detachably mounting on a pipe clamp of the teleprompter, and
a second sliding seat slidingly installed on the guide tube, wherein the second sliding seat is configured for installing camera equipment.

* * * * *